United States Patent
Guyot et al.

(10) Patent No.: US 10,480,120 B2
(45) Date of Patent: Nov. 19, 2019

(54) COVERING FOR FLOORS, WALLS OR CEILINGS, AND METHOD FOR OBTAINING A COVERING

(71) Applicant: BEAULIEU INTERNATIONAL GROUP NV, Waregem (BE)

(72) Inventors: Jean-Claude Guyot, Baschleiden (LU); Tim Vanderhaegen, Dendermonde (BE)

(73) Assignee: Beaulieu International Group NV, Waregem (BE)

( * ) Notice: Subject to any disclaimer, the term of this patent is extended or adjusted under 35 U.S.C. 154(b) by 0 days.

(21) Appl. No.: 15/543,383

(22) PCT Filed: Jan. 15, 2016

(86) PCT No.: PCT/EP2016/050734
§ 371 (c)(1),
(2) Date: Jul. 13, 2017

(87) PCT Pub. No.: WO2016/113378
PCT Pub. Date: Jul. 21, 2016

(65) Prior Publication Data
US 2017/0356130 A1    Dec. 14, 2017

(30) Foreign Application Priority Data
Jan. 16, 2015   (EP) .................................... 15151529

(51) Int. Cl.
*D06N 3/06* (2006.01)
*B32B 5/24* (2006.01)
(Continued)

(52) U.S. Cl.
CPC ................ *D06N 3/06* (2013.01); *B32B 3/30* (2013.01); *B32B 5/08* (2013.01); *B32B 5/24* (2013.01);
(Continued)

(58) Field of Classification Search
None
See application file for complete search history.

(56) References Cited

U.S. PATENT DOCUMENTS

| 4,689,256 A | 8/1987 | Slosberg |
| 2002/0160677 A1 | 10/2002 | Loffler |

(Continued)

FOREIGN PATENT DOCUMENTS

| WO | 9935327 A2 | 7/1999 |
| WO | 0210504 A2 | 2/2002 |
| WO | 2011069996 A1 | 6/2011 |

*Primary Examiner* — Shawn Mckinnon
(74) *Attorney, Agent, or Firm* — James Creighton Wray

(57) ABSTRACT

The current invention concerns a covering, such as a floor covering, wall covering or ceiling covering, said covering comprising a surface layer, and a substrate layer attached to said surface layer, said substrate layer optionally comprising one or more reinforced thermoplastic layers. Said covering further comprises a backing layer on the bottom side of said substrate layer, opposite to said surface layer, and a textile layer attached to the bottom side of said backing layer, optionally through a contact layer. The covering further comprises a coating applied to the bottom of said textile layer. The invention also provides a method for producing a covering, such as a floor covering, wall covering or ceiling covering.

14 Claims, 1 Drawing Sheet

(51) Int. Cl.
  *B32B 3/30*    (2006.01)
  *B32B 27/12*   (2006.01)
  *B32B 27/20*   (2006.01)
  *D06N 7/00*    (2006.01)
  *B32B 27/30*   (2006.01)
  *B32B 5/08*    (2006.01)
  *B32B 27/08*   (2006.01)
  *E04C 1/00*    (2006.01)

(52) U.S. Cl.
  CPC .............. *B32B 27/08* (2013.01); *B32B 27/12* (2013.01); *B32B 27/20* (2013.01); *B32B 27/304* (2013.01); *D06N 7/0036* (2013.01); *E04C 1/00* (2013.01)

(56) References Cited

U.S. PATENT DOCUMENTS

| | | | |
|---|---|---|---|
| 2008/0233336 A1 | 9/2008 | Giannopoulos | |
| 2012/0244310 A1* | 9/2012 | Visscher | B32B 5/08 428/95 |
| 2013/0333821 A1* | 12/2013 | Hahn | B32B 5/26 156/60 |

* cited by examiner

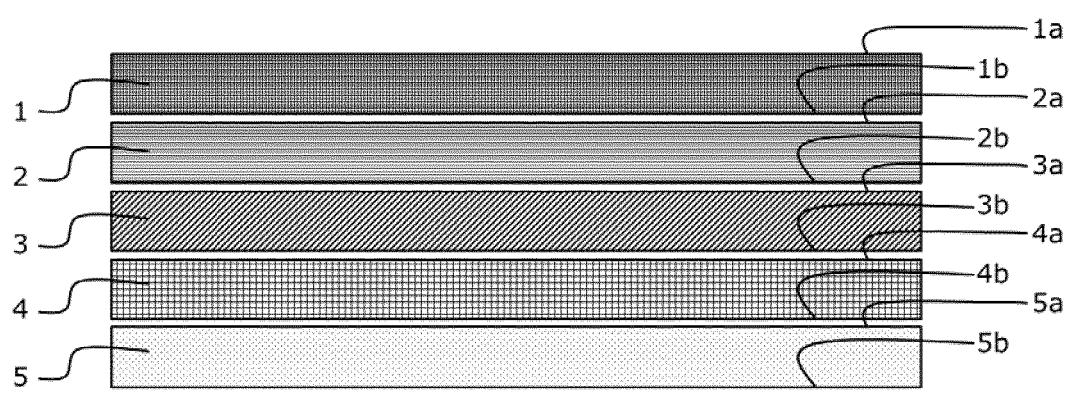

COVERING FOR FLOORS, WALLS OR CEILINGS, AND METHOD FOR OBTAINING A COVERING

This application claims the benefit of European Application No. 1515529.3 filed Jan. 16, 2015, and PCT/EP2016/050734 filed Jan. 15, 2016, International Publication No. WO 2016/113378 A1, which are hereby incorporated by reference in their entirety as if fully set forth herein.

TECHNICAL FIELD

The invention pertains to the technical field of surface coverings, such as coverings for floors, walls or ceilings.

BACKGROUND

Flexible plastic surface coverings have been produced for a very long time. This type of surface covering is suitable for covering surfaces, such as, for example, floors, walls or ceilings of the interior of buildings, such as, for example, offices, hospitals or homes. Flexible plastic surface coverings can be applied to surfaces by placing an adhesive underneath the surface coverings. This type of covering is typically a composite product, comprising various layers. Flexible plastic surface coverings generally comprise a substrate layer of a thermoplastic material which is often reinforced with a textile material embedded in the mass of the thermoplastic material. Also, in order to improve the level of comfort and to provide the covering with insulation and flexibility qualities, the reverse surface of the covering may be associated with a foamed backing. Furthermore, the upper surface is covered with a finishing layer which provides the covering with specific properties such as resistance to UV rays, dirt deposit, scratches, wear, abrasion, etc. The coverings may be produced using different techniques such as coating, calendering, pressing, etc. In order to create the covering using the coating technique a surface layer is produced by impregnating a reinforcement textile structure, which is generally unwoven, the structure very often being fibreglass based, although it can also have a synthetic polymer base, such as polyester, polyamide or polypropylene fibres. These coatings are produced from a plastisol composition, more often than not PVC based, although it can also be acrylic, polyurethane or polyolefin based to provide a smooth, flat surface. Once the surface layer has been produced, one or more top layers are created that are intended to provide the decorative and wear-and-tear characteristics. A compact layer can be provided at the reverse surface to ensure the finish. Providing a mechanical or chemical foam-based backing layer at the reverse surface confers acoustic and thermal insulation and/or comfort. General examples of quality deficiencies of flexible plastic surface coverings include excessive curling and/or indentation, which should be avoided.

EP 1 360 366 concerns a floor covering produced by coating and comprising a thermoplastic-based substrate layer structure, in particular plasticized PVC, reinforced with a textile reinforcement, optionally combined with a foam backing and whereof the visible surface consists of a surface coating providing decoration and wear resistance to the product. The invention is characterised in that the back surface designed to be in contact with a floor, consists of a textile web, the bonding between the textile structure and the supporting back surface being produced by means of an additional plastisol layer, which penetrates over a minor part of the thickness of the textile structure and which, after gelling, bonds the textile to the thermoplastic substrate back surface.

In EP 1 360 366, the textile structure at the back surface of the floor covering creates a large specific surface area on this back surface which is designed to be in contact with the floor. When applying the floor covering of EP 1 360 366 to a floor surface, this large specific surface area requires a higher amount of adhesive to ensure a durable bond between floor covering and floor surface, when compared to a covering with a lower specific surface area, approaching a smooth surface. Besides, the addition of an additional layer to the floor covering of EP 1 360 366 would improve the rigidity or stiffness of such a covering.

Floor coverings as described in EP 1 360 366 are typically provided in rolls. These rolls can contain substantial amounts of a floor covering, resulting in heavy rolls. Such heavy rolls are not easy to handle. In this respect, the production of plastic floor or surface coverings with modular dimensions is of interest, as this can result in a lower weight product which is easier to handle. Furthermore, such coverings will cause less product loss on installation of the coverings, which is ecologically beneficial. Besides, such coverings with modular dimensions can provide a more natural look, as repetitions in design are interrupted at level of the places where individual coverings meet. Besides, providing a bevel on edges of the coverings can further improve the natural look.

Punching out panels out of a covering and afterwards providing each panel separately with a bevel is known. The major disadvantages of punching are the high investment cost for the punching machine, the lack of flexibility since each format requires an appropriate cutting tool, and the difficulty for getting clean cuts in the corner of the panel. For beveled products, a supplementary operation is needed in order to bevel both long sides and short sides There remains a need in the art for an improved plastic surface covering which has a sufficient stiffness and can be applied efficiently and economically to a surface, such as, for example, a floor, wall or ceiling.

The present invention aims to resolve at least some of the problems mentioned above.

SUMMARY OF THE INVENTION

In a first aspect, the present invention provides a covering, such as a floor covering, wall covering or ceiling covering, said covering comprising:
- a surface layer (1);
- a substrate layer (2) attached to said surface layer (1), said substrate layer (2) optionally comprising one or more reinforced thermoplastic layers;
- a backing layer (3) on the bottom side (2*b*) of said substrate layer (2), opposite to said surface layer (1);
- a textile layer (4) attached to the bottom side (3*b*) of said backing layer (3), optionally through a contact layer;

whereby said covering further comprises a coating (5) applied to the bottom side (4*b*) of said textile layer (4).

The application of the coating in the covering increases the rigidity of the covering and the resistance of the covering to indentation. It further prevents wrinkling of the textile layer.

In a second aspect, the present invention provides a method for producing a covering, such as a floor covering, wall covering or ceiling covering, the method, comprising the steps of:

producing a substrate layer (2) comprising one or more thermoplastic layers, and optionally, one or more reinforced thermoplastic layers;

attaching a surface layer (1) to the top side (2a) of said substrate layer (2);

attaching the top side (3a) of a backing layer (3) to the bottom side (2b) of said substrate layer (2);

attaching the top side (4a) of a textile layer (4) to the bottom side (3b) of said backing layer (3), optionally, through a contact layer, whereby a coating (5) is applied to the bottom side (4b) of said textile layer (4); thereby obtaining a covering.

The step of applying the coating to the textile layer provides a covering with an increased rigidity and an increased resistance to indentation.

In a preferred embodiment of the method according to the second aspect of the invention, said covering is cut into panels and a bevel is created simultaneously on the panels on both sides of the cut.

DESCRIPTION OF FIGURES

For a better understanding of the present invention, reference is made to the detailed description of the invention, by way of example, which is to be read in conjunction with the following FIGURE, wherein:

FIG. 1 is a schematic representation of a covering according to the present invention.

DETAILED DESCRIPTION OF THE INVENTION

The present invention concerns a covering, such as a floor covering, wall covering or ceiling covering.

The recitation of numerical ranges by endpoints includes all numbers and fractions subsumed within that range, as well as the recited endpoints.

All percentages are to be understood as percentage by weight and are abbreviated as "wt. %", unless otherwise defined or unless a different meaning is obvious to the person skilled in the art from its use and in the context wherein it is used.

The term "polymer" as used herein, also referred herein as "polymeric material", can be any one or more polymers. For instance, a polymer can be a thermoplastic or thermosetting polymer. The polymer can be any polymer, including natural products and synthetic products. Polymeric materials can be, for example, thermoplastic polymers, thermosetting polymers, rubbers (elastomers), or any combinations thereof. Further, the polymer can be, for example, any type of polymer, such as a homopolymer, random polymer, alternating polymer, graft polymer, block polymer, star-like polymer, comblike polymer, crosslinked polymer, and/or vulcanized polymer. The polymer can be one or more polyblends. The polymer can be, for example, a thermoplastic elastomer (TPE), an interpenetrating polymer network (IPN); simultaneous interpenetrating polymer network (SIN); or interpenetrating elastomeric network (IEN). Examples of polymers include, but are not limited to, a silicone-containing polymer, for instance, polydimethyl siloxane, fluorosilicones, silicone-organic polymers, or silicone-organic hybrid polymers, olefin-containing, diene-containing and butene-containing polymers and copolymers. Particular examples include elastomers such as solution styrene-butadiene rubber (SBR), natural rubber, emulsion SBR, polybutadiene, polyisobutadiene, polyisoprene, polychloroprene, NBR, EPDM, EPM, isobutene elastomers, and their functionalized or modified derivatives or blends thereof. Other examples of polymers include, but are not limited to, linear and nonlinear polymers such as polyethylene, poly(vinylchloride), polyisobutylene, polystyrene(s), polycaprolactam (nylon), polyisoprene, and the like. Other general classes of polymers include polyamides, polycarbonates, polyelectrolytes, polyesters, polyethers, (polyhydroxy)benzenes, polyimides, polymers containing sulfur (such as polysulfides, (polyphenylene) sulfide, and polysulfones), polyolefins, polymethylbenzenes, polystyrene and styrene copolymers (ABS included), acetal polymers, acrylic polymers, acrylonitrile polymers and copolymers, polyolefins containing halogen (such as polyvinyl chloride and polyvinylidene chloride), cellulose acetate, ethylene-vinyl acetate, polyacrylonitrile, fluoropolymers and fluoroplastics, ionomeric polymers, polymers containing ketone group(s), polyketone, liquid crystal polymers, polyamide-imides, polyaryletherketone, polymers containing olefinic double bond(s) (such as polybutadiene, polydicyclopentadiene), polyphenylene oxides, polyurethanes, thermoplastic elastomers, polyolefins (such as polyethylene, 1-butene, polypropylene, 1-hexene, 1-octene, 4-methyl-1-pentene, substituted alpha-olefins, and the like), polyolefin copolymers (such as copolymers of: ethylene, 1-butene, propylene, 1-hexene, 1-octene, 4-methyl-1-pentene and substituted alpha-olefins and the like), polyolefin terpolymers, polycarbonates, silicone polymers, alkyd, epoxy, unsaturated polyester, vinyl ester, urea-, melamine-, or phenol-formaldehyde resins, and the like. Other examples of the polymer can be a methacrylic polymer, or a styrenic polymer.

As used herein, the term "thermoplastic polymer", also referred to as "thermoplastic material" in the present text, refers to a polymeric material that becomes pliable or moldable above a specific temperature and substantially solidifies upon cooling. Examples of thermoplastic polymers include, but are not limited to, vinyl containing thermoplastics such as polyvinyl chloride, polyvinyl acetate, polyvinyl alcohol, and other vinyl and vinylidene resins and copolymers thereof; polyethylenes such as low density polyethylenes and high density polyethylenes and copolymers thereof; styrenes such as ABS, SAN, and polystyrenes and copolymers thereof, polypropylene and copolymers thereof; saturated and unsaturated polyesters; acrylics; polyamides such as nylon containing types; engineering plastics such as acetyl, polycarbonate, polyimide, polysulfone, and polyphenylene oxide and sulfide resins and the like.

With the term "filler" as used herein, a component is meant that can improve the properties of a composition by, for example, improving its texture or structure, by providing dimensional stability and reduced elasticity, by providing properties of fire resistance and/or by reducing the overall cost of the composition. Examples of fillers include, but are not limited to, limestone, barium sulphate, chalk, talc, kaoline, silica, alumina, magnesium hydroxide, clay, asbestos, grit particles or any combination of the previous. The filler can be recycled from any source and may be in any physical form that allows it to be mixed or blended with the other ingredients of a composition. Typically, the filler is added in the form of particles.

As used herein, a "stabilizer" refers to a compound that can provide heat stability and/or UV light stability to a polymer, preferably a polyvinyl chloride polymer. The stabilizer according to the present invention can be selected for effectiveness with the particular polymer used. Examples of stabilizers include, but are not limited to, calcium-zinc stabilizers, barium-cadmium stabilizers, barium-zinc stabilizers, organotin stabilizers, epoxidized soybean oils, and the like. A calcium-zinc stabilizer containing about 5.5 wt. % or more zinc may be used, such as about 6.0 wt. % to about 10.0 wt. % zinc. Specific non-limiting examples of zinc-calcium stabilizers are supplied by Chemson, Inc. under the product codes of PTP113 (5.8 wt. % zinc, 10.5 wt. % calcium).

With the term "plasticizer" as used herein, a compound is meant that typically can increase the fluidity or plasticity of a material, typically a polymer. The plasticizer can be any conventional plasticizer known in the art. For example, the plasticizer may be a phthalic diester, such as diisononyl phthalate (DINP). Other examples of plasticizers include, but are not limited to ditridecyl phthalate, diiosdecyl phthalate, dipropylheptyl phtalate, diisooctyl terephthalate (DOTP), benzoates, adipates, any o-phthalate free plasticisers, natural-material based plasticizers, and the like.

As used herein, the term "common additives" refers to any one or combination of more than one of the following: infrared attenuating agents (for example, carbon black, graphite, metal flake, titanium dioxide); flame retardants (for example, aluminium trihydroxide, brominated flame retardants such as brominated polymers, hexabromocyclododecane, phosphorous flame retardants such as triphenylphosphate, and flame retardant packages that may including synergists such as, for example, dicumyl and polycumyl); lubricants (for example, calcium stearate and barium stearate); acid scavengers (for example, magnesium oxide and tetrasodium pyrophosphate).

As used herein, an "adhesive" may be a compound such as a chemical adhesive which, for example, can be a one-part or multiple-part adhesive such as a two-component polyurethane liquid adhesive, for example, a polyurethane or an epoxy; a film such as double sided tape or pressure sensitive adhesive; or another layer or film comprising a material which is compatible with (i.e., bonds to) both a first layer and a second layer. Examples include polyolefin copolymers such as ethylene/vinyl acetate, ethylene/acrylic acid, ethylene/n-butyl acrylate, ethylene ionomers, ethylene/methylacrylate, and ethylene or propylene graft anhydrides. Other useful adhesives include urethanes, copolyesters and copolyamides, styrene block copolymers such as styrene/butadiene and styrene/isoprene polymers, acrylic polymers, and the like. The adhesives may be thermoplastic or curable thermosetting polymers, and can include tacky, pressure-sensitive adhesives. Further suitable adhesives are foam craft adhesives such as 3M Styrofoam Spray Adhesive, adhesives based on dispersions, e.g. ACRONAL™ Acrylate Dispersions available from BASF, one-component polyurethane adhesive such as INSTASTIK™ available from The Dow Chemical Company, hot-melt adhesives, moisture-cured adhesives such as those described in U.S. Pat. No. 7,217,459B2, single- or preferably two-component adhesives based on polyurethane resins or on epoxy resins, see USP 20080038516A1, and the like.

A "colorant" as used herein, refers to a component that is added or applied to, for example, a material, to cause a change in colour. Colorants can be dyes, pigments, inks, paints, etc. A "dye" is a coloured substance that typically has an affinity for the material to which it is being applied. The dye is typically applied in a solution and usually requires a mordant to improve the fastness of the dye on, for example, a material, i.e. in order to fixate the dye to the material. Colorants such as dyes and pigments appear to be coloured because they absorb some wavelengths of light more than others. In contrast with a dye, a "pigment" generally is insoluble, and typically has no affinity for the material to which it is being applied.

The term "foamed" or "foam" indicates that the referent following the term, such as, for example, a layer, material, etc., comprises one or more blowing agents. With the term "blowing agent", a compound is meant which is capable of forming a cellular structure in a wide variety of materials, typically under the influence of heat, via a foaming process. Such cellular structure typically lowers the density of the material and typically results in an expansion in volume of the material. The blowing agent in the foamed plastic-based material may include at least one selected from a chemical blowing agent, a physical blowing agent, or a mixture thereof. Physical blowing agents are typically added to the material in a liquid phase, after which the temperature is raised, thereby transforming the blowing agent into its gaseous phase, and hence resulting in the formation of a cellular structure and the expansion of the material, though they may also be directly added to the material in their gaseous phase. Chemical blowing agents will undergo a chemical reaction under the influence of heat, thereby forming gaseous products that will form the cellular structure. As the chemical blowing agent, any compound may be used as long as the compound may be decomposed at a specific temperature to generate gas, and an example thereof may include azodicarbonamide, azodi-isobutyro-nitrile, benzene-sulfonhydrazide, 4,4-oxybenzene sulfonyl-semicarbazide, p-toluene sulfonyl semicarbazide, barium azodicarboxylate, N,N'-dimethyl-N,N'-dinitrosoterephthalamide, trihydrazino triazine, sodium bicarbonate, potassium bicarbonate, ammonium bicarbonate, sodium carbonate, ammonium carbonate, as well as any derivative of the previous or any combination of the previous. Further, examples of a physical blowing agent may include an inorganic blowing agent such as carbon dioxide, nitrogen, oxygen, argon, water, air, helium, or the like, or an organic blowing agent such as aliphatic hydrocarbons containing 1 to 9 carbon atoms, including methane, ethane, propane, n-butane, isobutane, n-pentane, isopentane, neopentane, cyclobutane, and cyclopentane; fully and partially halogenated alkanes and alkenes having from one to five carbons, preferably that are chlorine-free (e.g., difluoromethane (HFC-32), perfluoromethane, ethyl fluoride (HFC-161), 1,1-difluoroethane (HFC-152a), 1,1,1-trifluoroethane (HFC-143a), 1,1,2,2-tetrafluoroethane (HFC-134), 1,1,1,2 tetrafluoroethane (HFC-134a), pentafluoroethane (HFC-125), perfluoroethane, 2,2-difluoropropane (HFC-272fb), 1,1,1-trifluoropropane (HFC-263fb), 1,1,1,2,3,3,3-heptafluoropropane (HFC-227ea), 1,1,1,3,3-pentafluoropropane (HFC-245fa), and 1,1,1,3,3-pentafluorobutane (HFC-365mfc)); fully and partially halogenated polymers and copolymers, desirably fluorinated polymers and copolymers, even more preferably chlorine-free fluorinated polymers and copolymers; aliphatic alcohols having from one to five carbons such as methanol, ethanol, n-propanol, and isopropanol; carbonyl containing compounds such as acetone, 2-butanone, and acetaldehyde; ether containing compounds such as dimethyl ether, diethyl ether, methyl ethyl ether and carboxylate compounds such as methyl formate, methyl acetate, ethyl acetate and carboxylic acid, or any combination of the previous. The amount of blowing agent can be determined by one of ordinary skill in the art without undue experimentation for a given material to be foamed based on the type of material, type of blowing agent, the shape/configuration of the to be foamed material, and the desired foam density. Alternatively, a cellular structure in a wide variety of materials, optionally under the influence of heat, may be obtained via mechanical foaming process. Mechanical foaming should be understood to be a method in which one or more gases, such as air, nitrogen and/or carbon dioxide gas, and the like, or mixtures thereof, are added directly to a material, thereby causing the material to foam. Generally, after foaming, the foamed material may have a density of from about 200 kilograms per cubic meter ($kg/m^3$) to about 1600 $kg/m^3$ or more. The foam density, typically, is selected depending on the particular application. Preferably the foamed material has a density of from about 600 $kg/m^3$ to about 1600 $kg/m^3$. More preferably, the foamed material has a density of from about 700 $kg/m^3$ to about 1300 $kg/m^3$. The cells of a foamed material may have an average size (largest dimension) of from about 0.05 to about 5.0 millimeter (mm), especially from about 0.1 to about 3.0 mm, as measured by ASTM D-3576-98.

1. Covering

The present invention relates to a covering, such as a floor covering, wall covering or ceiling covering, said covering comprising:

a surface layer (1);
a substrate layer (2) attached to said surface layer (1), said substrate layer (2) optionally comprising one or more reinforced thermoplastic layers;
a backing layer (3) on the bottom side (2*b*) of said substrate layer (2), opposite to said surface layer (1);
a textile layer (4) attached to the bottom side (3*b*) of said backing layer (3), optionally through a contact layer;

whereby said covering further comprises a coating (5) applied to the bottom side (4*b*) of said textile layer (4).

FIG. 1 provides a schematic representation of a covering according to the present invention, showing a surface layer (1), a substrate layer (2), a backing layer (3), a textile layer (4), and a coating (5). All these elements comprise top (1*a*, 2*a*, 3*a*, 4*a*, 5*a*) and bottom sides (1*b*, 2*b*, 3*b*, 4*b*, 5*b*). The top side (2*a*) of the substrate layer (2) is attached to the bottom side (1*b*) of the surface layer (1). The top side (3*a*) of the backing layer (3) is attached to the bottom side (2*b*) of the substrate layer (2). The top side (4*a*) of the textile layer (4) is attached to the bottom side (3*b*) of the backing layer (3). The top side (5*a*) of the coating (5) is attached to the bottom side (4*b*) of the textile layer (4). Optionally, a contact layer is provided between the backing layer (3) and the textile layer (4).

The covering of the present invention can be any surface covering, such as a floor covering, wall covering, ceiling covering, and the like. The surface covering can be used essentially in any room in a house or work environment, including the kitchen, bathroom, living room, dining room, recreation room, garage, and outside living spaces, such as a porch, deck, shed, terrace, summerhouse, and the like. The surface coverings of the present invention can be used in indoor or outdoor applications, especially since the coverings of the present invention are water resistant and do not swell when wet. In fact, the swelling of the surface coverings of the present invention is negligent (e.g., zero or zero to less than 0.01 mm or 0.0001 mm to less than 0.001 mm) when tested at LF 3.2 of NALFA LF 01-2003. Thus, the covering being water resistant, the covering can be used indoors or outdoors. For instance, the coverings are water resistant such that they will not swell when immersing in water for several hours. Further, the coverings are resistant to various chemicals and detergents and, therefore, can even be used in industrial, recreational, or garage environments. The covering of the present invention is relatively lightweight and relatively thin in thickness. The covering can have any suitable length and/or width and can be provided in any shape, such as a rounded shape and a polygonal shape. Preferably, the covering is provided in the shape of a square or a rectangle.

1.1 Surface Layer

The surface layer constitutes a layer of the covering. In an embodiment of the invention, the surface layer comprises a wear layer. The wear layer primarily functions to protect the covering from harming factors such as, for example, scratching, wear and abrasion. The wear layer comprises a polymeric material. The wear layer is preferably a transparent layer, enabling the aspect of an underlying decorative pattern to be visible.

Performing mechanical embossing on the wear layer, for example, performed by a mechanical embossing system, can be used to provide a textured appearance to the wear layer as well as to an underlying decorative layer.

A wear layer with sufficient wear resistance can be understood as a wear layer belonging to wear group T according to EN 660-2 and/or belonging to class AC2, AC3 or higher, as defined in EN 13329.

The wear layer preferably has a weight per square meter or basis weight from 10 to 1500 gsm, yet more preferably from 50 to 900 gsm.

Preferably, the wear layer comprises a thermoplastic material. The wear layer can be obtained by means of extrusion, coating, calendering, printing and/or digital printing of such thermoplastic material.

Preferably, the wear layer comprises PVC. Even more preferably, a PVC material is used with a K value from 60 to 95 and more preferably a K value from 70 to 90. The K value is defined as a measure of the polymer chain length and is described in detail by K. Fikentscher in "Cellulosechemie", 13, 58 (1932). Optionally, additives, such as, for example, glass beads and flake glass, and/or abrasion particles can be added to improve the wear resistance, yet this does not seem necessary for a good embodiment to retain a sufficient wear resistance.

In the embodiment where the wear layer comprises PVC, the wear layer possesses a thickness of at least 0.10 mm and more preferably at least 0.12 mm. Preferably, the thickness of the wear layer is at most 1.0 mm and more preferably at most 0.75 mm. Most preferably, the wear layer possesses a thickness from 0.15 mm to 0.70 mm.

In the embodiment where the wear layer comprises PVC, one or more plasticizers may be included in the composition of the wear layer. Various stabilizers as well as colorants may also be included in the composition of the wear layer. Besides, common additives may be included in the composition of the wear layer.

In another embodiment, the surface layer comprises a decorative layer. The decorative layer is preferably shielded from the environment by a wear layer. The decorative layer comprises a polymeric material. Preferably, the decorative layer comprises a thermoplastic material. The decorative layer may comprise a filler. Preferably, the filler is chalk. The chalk is preferably comprised of particles with at least 95% of the particles having a size of at most 150 µm, and more preferably of at most 100 µm, measured according to ISO 13317-3. In an embodiment of the present invention, the fillers constitute at least 10 wt. %, preferably at least 15 wt. % and more preferably from 20 to 40 wt. % of the decorative layer, calculated relatively to the total weight of the decorative layer. The decorative layer preferably has a thickness from 0.1 to 1.0 mm. The decorative layer preferably has a weight per square meter or basis weight from 150 to 500 gsm, yet more preferably from 200 to 300 gsm. The decorative layer preferably possesses a decorative pattern. For example, the decorative pattern may be a wood, stone, or any other desired pattern. The decorative pattern is preferably a printed pattern. The printed pattern may be applied by any suitable printing technique. The printed pattern can be any pattern which is capable of being printed onto the decorative layer. Rotogravure printing, transfer printing, digital printing and laser printing are non-excluding examples of suitable printing techniques.

One or more plasticizers may be included in the composition of the decorative layer. Various stabilizers as well as colorants may also be included in the composition of the decorative layer. Besides, common additives may be included in the composition of the decorative layer. Preferably, the decorative layer comprises PVC. More preferably, the PVC comprises a feasible plasticizer content, meaning that the plasticizer content in the composition is lower than 35 wt. %, and by preference lower than 25 wt. %. Even more preferably, PVC is used with a K value from 50 to 80, and more preferably a K value from 60 to 75. Accordingly, a resilient PVC layer is obtained which can be printed very precisely. Furthermore, the drying process after printing using water-based inks is very easy by means of the necessary heat supply to the decorative layer.

In an alternative embodiment, chemical embossing can be used to provide the surface layer with a textured appearance. In case of chemical embossing, the composition of the decorative layer comprises a blowing agent next to the thermoplastic material. Besides, for the chemical embossing, the pattern is printed on the decorative layers using inks of which at least one contains an expansion inhibitor. When heating a composition comprising a thermoplastic material, blowing agent and at least one expansion inhibitor comprised in an ink, different degrees of expansion exist between the inhibited printed zones and the uninhibited printed zones, producing an embossed decorative layer, the degree of expansion being lower in the inhibited printed zones. When a wear layer is present above the decorative layer, both the wear layer and the decorative layer will be embossed as a result of the expansion of the decorative layer. Inhibited printed zones correspond to the parts of the printed pattern comprising an expansion inhibitor while uninhibited printed zones correspond to the parts of the printed pattern comprising no expansion inhibitor. The expansion inhibitor may be selected from the group consisting of fumaric acid, trimellitic anhydride and tolyltriazole, benzotriazole, thiourea, and functionalised analogues thereof.

In another embodiment, the surface layer may comprise a surface coating on top of the wear layer. In a surface layer with decorative layer, wear layer and surface coating, the wear layer is situated on top of the decorative layer while the surface coating is situated on top of the wear layer. The surface coating constitutes an additional protection against wear or scratches. Besides, the surface coating improves the cleanability and the mattness of the surface layer. The surface coating may be comprised of a UV-curable lacquer or a thermally curable lacquer. A non-limiting example of a thermally curable lacquer is a heat-curable powder lacquer based on polyurethane. The surface coating is preferably comprised of a UV-curable lacquer or UV lacquer. Typical UV lacquers or varnishes are applied at room temperature and consist of epoxy acrylate, polyester acrylate or urethane acrylate oligomers combined with acrylate functional monomers in the presence of a photoinitiator. Under suitable UV wavelengths, the photoinitiators produce free-radicals which polymerize the acrylate functional groups to produce a cross-linked network. In other words, UV lacquers are curable by application of UV light. The curing by UV light has the particular advantage that it accelerates the production process. Relatively high concentrations of low viscosity reactive monomers, such as, for example, hexanediol diacrylate, tripropylene glycol diacrylate and hydroxyl ethyl methacrylate, have to be used to reduce the viscosity of the coating composition in order to get good flow and levelling at room temperature. UV-curable lacquers are often used and applied by a roller, or sometimes by spraying. Quite often, three to four layers of varnish are applied. Typically, only layers of 10 to 20 µm thick can be applied due to the low viscosity.

In an alternative embodiment, the surface layer may comprise a textile surface layer. The textile surface layer may be a woven or nonwoven fibre structure. A needle felt is an example of a nonwoven fibre structure. When a textile surface layer is present, a decorative layer, wear layer and/or surface coating may be omitted.

1.2 Substrate Layer

The top side of the substrate layer is attached to the bottom side of the surface layer. The substrate layer comprises a polymeric material. Preferably, the substrate layer comprises a thermoplastic material. The substrate layer and the surface layer are preferably attached by coating techniques, yet may also be attached by any other suitable technique, such as, for example, calendering, solvent welding, ultrasonic welding and adhesive assisted lamination. The substrate layer may be a multi-layered structure, comprising various layers. The independent layers of the substrate layer are also preferably attached to each other by coating techniques, yet may also be attached to each other by any other suitable technique, such as, for example, calendering, solvent welding, ultrasonic welding and adhesive assisted lamination. The weight per square meter or basis weight for the substrate layer ranges from 400 to 850 gsm, yet more preferably from 500 to 800 gsm. The substrate layer preferably includes plasticizers. Various stabilizers as well as colorants may also be included in the composition of the substrate layer. Besides, common additives may be included in the composition of the substrate layer. Blowing agents may also be included. The substrate layer preferably further includes one or more fillers. Preferably, the filler is chalk. The chalk is preferably comprised of particles with at least 95% of the particles having a size of at most 150 µm, and more preferably of at most 100 µm, measured according to ISO 13317-3. Preferably, the fillers constitute at least 30 wt. %, preferably at least 45 wt. %, and at most 70 wt. %, preferably at most 55 wt. % of the substrate layer, calculated relatively to the total weight of the substrate layer. The substrate layer preferably has a thickness from 0.10 mm to 1.0 mm, and more preferably a thickness from 0.30 mm to 0.80 mm.

The substrate layer optionally comprises one or more reinforced thermoplastic layers. A reinforced thermoplastic layer is defined as a layer of thermoplastic material that is reinforced by a reinforcement material, the reinforcement material intended to contribute to the dimensional stability of the thermoplastic layer, which is desired to limit expansion or shrinkage. Preferably, PVC is selected as thermoplastic material.

In an embodiment of the present invention, such reinforcement material comprises individual reinforcement fibres which are not connected in a network, yet are loosely dispersed in the thermoplastic material. In a preferred embodiment, the individual reinforcement fibres have a length of at least 0.8 mm, preferably at least 1.0 mm. In a more preferred embodiment, the individual reinforcement fibres possess a length of at least 3.0 mm, preferably at least 4.5 mm, and at most 20.0 mm, preferably at most 15.0 mm and more preferably at most 12.0 mm. The reinforcement fibres are preferably comprised in the thermoplastic material in a quantity between 1 and 25 wt. %, and more preferably between 5 and 15 wt. %, relatively to the total weight of the reinforcement fibres and thermoplastic material. Preferably, the reinforcement fibres comply with the description of the DIN 1259 norm. In a first embodiment, glass fibres are used as reinforcement fibre material. In an alternative embodiment of the present invention, steel fibres, carbon fibres, and/or aramide fibres may be used as reinforcement material. In yet another alternative embodiment, fibres of biological origin, such as, yet not limited to, flax fibres, bamboo fibres, wood fibres and/or rice fibres may be used as reinforcement fibre material. The reinforcement fibres possess preferably an average diameter situated between 1 and 100 µm, more preferably between 3 and 30 µm and most preferably between 5 and 25 µm. In an additional preferred embodiment, the reinforcement fibres are pre-treated with an additive or coating to improve the adhesion between the reinforcement fibres and the thermoplastic material, for example, yet not limited to, silane. In an additional preferred embodiment, reinforcement fibres are selected that have a thermal expansion coefficient smaller than the thermal expansion coefficient of the thermoplastic material in which the reinforcement fibres are comprised and/or with an elastic modulus preferably higher than the elastic modulus of the thermoplastic material, and preferably higher than 40 GPa, more preferably higher than 60 GPa. In an additional preferred embodiment, the reinforcement fibres possess a thermal expansion coefficient smaller than 30 µm/m·K, more preferably smaller than 5 µm/m·K. Such small thermal expansion coefficient values of the reinforcement fibres confer thermal stability to the substrate layer. A reinforcement material comprising fibres may be structured in a woven or nonwoven fibre structure. In a preferred embodiment, the glass fibres are comprised in a glass fibre film or fleece, such as, for example, a nonwoven. Such nonwoven glass fibres seem to have a better impregnation in a thermoplastic material, resulting in a substrate layer with higher strength and stiffness. Impregnation of a glass fibre with thermoplastic material is of importance, because it avoids aspect defects. Such nonwoven glass fibre preferably has a weight per square meter or basis weight from 30 to 70 gsm, yet more preferably from 35 to 50 gsm.

In an embodiment of the present invention, the reinforcement material is a nonwoven spun-bond material. A spun-bond nonwoven material is preferred above other nonwoven materials, such as, for example, needle-punched nonwoven material, since a spun-bond nonwoven material possesses high material strength. Preferably, the nonwoven material is comprised of two synthetic materials, whereby the two synthetic materials have a different melting point. The different polymers, where the nonwoven material is made from, exist either in separate filaments or together in one filament. It would therefore be possible that the nonwoven material comprises two filament types. The two filament types are predominantly made from different polymers with different melting points, so-called bifilament types. The term "predominantly" as used herein means at least 90%. It is preferred that the melting points of the two different polymers differ by at least 10° C. More preferably the melting points differ by at least 50° C. Such a product could also be thermally bonded by subjecting the nonwoven product to a temperature in the range of the melting point of the polymer with the lower melting point. However, this nonwoven product would not be bonded at each crossing point since fibres comprising the polymer with the higher melting point might cross each other. Only crossing points of fibres in a combination high and low melting point or low and low melting point would be bonded and not the crossing points of fibres with high melting point. A nonwoven carrier made from bicomponent filaments is therefore preferred. The bicomponent filaments of the nonwoven carrier are thermally bonded. Bicomponent filaments are filaments of two polymers of different chemical construction. A basic distinction is being drawn between three types: side by side types, sheath core types and matrix/fibril types. The nonwoven material comprises preferably a sheath-core type bicomponent nonwoven material. Preferably, the nonwoven material comprises sheath-core type bicomponent filaments. Such a sheath-core type bicomponent nonwoven material possesses a core which acts as a backbone with the sheath being the bonding medium of the backbone. The structure of such a product becomes very stable because the filaments are bonded at each crossing point of the filaments thus creating a nonwoven with the highest quantity of bonding points. The dimensional stability of the nonwoven carrier can be made regular over the length and width by optimising the filament distribution. This structure gives enough resistance to the high local impregnation pressure needed for obtaining a smooth impregnated surface over the full width. The great number of bonding points provides a stable nonwoven material already at low area unit weights while leaving enough open space for penetration of the thermoplastic material through the nonwoven textile layer, which ensures good mechanical bonding. The sheath-core type bicomponent nonwoven material possesses a uniform stability. The properties of the described sheath-core type bicomponent nonwoven material make possible a stable processing at low weight and thickness. Preferably, the sheath-core type bicomponent nonwoven material comprises a core consisting mainly of polyester and a sheath consisting mainly of polyamide. Alternatively, the sheath consists mainly of polyamide 6 and the core consists mainly of polyethylene terephthalate. Preferably the sheath/core ratio lies between 95/5 volume percent and 5/95 volume percent. More preferably the sheath/core ratio lies between 50/50 volume percent and 5/95 volume percent. The nonwoven material preferably has a basis weight of 50 gsm to 2500 gsm. More preferably, the nonwoven material has a basis weight of 65 gsm to 1000 gsm. Even more preferably, the nonwoven material has a basis weight of 70 gsm to 350 gsm. Most preferably, the nonwoven material has a basis weight of 75 to 180 gsm. A basis weight of the nonwoven material between these limits ensures that the nonwoven material is open enough for penetration of the thermoplastic material, ensuring good mechanical bonding. A higher basis weight can be selected for the nonwoven material when high rigidity is desired while a lower basis weight results in more flexible and more economical materials.

In an embodiment of the present invention, the substrate layer preferably possesses a decorative pattern. For example, the decorative pattern may be a wood, stone, or any other desired pattern. The decorative pattern is preferably a printed pattern. The printed pattern may be applied by any suitable printing technique. The printed pattern can be any pattern which is capable of being printed onto the substrate layer. Rotogravure printing, transfer printing, digital printing and laser printing are non-excluding examples of suitable printing techniques.

1.3 Backing Layer

The covering comprises a backing layer on the bottom side of the substrate layer, opposite to the surface layer. The top side of the backing layer is preferably attached to the bottom side of the substrate layer by coating techniques, yet may also be attached by any other suitable technique, such as, for example, calendering, solvent welding, ultrasonic welding and adhesive assisted lamination. The application of the backing layer in the covering contributes to the desired stiffness of the covering. The backing layer comprises a polymeric material. Preferably, the backing layer comprises a thermoplastic material. One or more plasticizers may be included in the composition of the backing layer. Various stabilizers as well as colorants may also be included in the composition of the backing layer. Besides, common additives may be included in the composition of the backing layer. The backing layer may be compact or foamed. A compact backing layer preferably has a thickness from 0.15 mm to 1.5 mm, and more preferably from 0.30 mm to 1.0 mm. The backing layer preferably includes one or more fillers. Preferably, the filler is chalk. The chalk is preferably comprised of particles with at least 95% of the particles having a size of at most 150 µm, and more preferably of at most 100 µm, measured according to ISO 13317-3. Preferably, the fillers constitute at least 20 wt. %, preferably at least 30 wt. %, and more preferably from 40 to 45 wt. % of the backing layer, calculated relatively to the total weight of the backing layer.

A compact backing layer preferably comprises PVC as a thermoplastic material. A foamed backing layer may be obtained using one or more chemical and/or physical blowing agents, or may be the result of a mechanical foaming process. Preferably, one or more chemical blowing agents are used. More preferably, the foamed backing layer is a PVC foam. Even more preferably, the foamed backing layer is a closed-cell and/or partly open cell PVC foam with a density from about 200 kg/m$^3$ to about 1600 kg/m$^3$ or more, preferably about 600 kg/m$^3$ to about 1600 kg/m$^3$, and more preferably from about 700 kg/m$^3$ to about 1300 kg/m$^3$. The application of such a foamed backing layer provides the covering with a good rigidity, bending stiffness and dimensional stability, next to a good water resistance, and better acoustic and/or thermal insulation. Alternatively, the foamed backing layer may comprise other thermoplastic materials than PVC. In an alternative embodiment of the invention, the foamed backing layer mainly comprises another vinyl compound than PVC, such as polyvinyl dichloride, polyvinyl butyrate, polyvinyl acetate and such like. In another alternative embodiment, melamine, polyurethane and polyisocyanurate may be used as materials for the foamed backing layer. As mentioned above, a density of about 1000 kg/m$^3$ is the most preferred density for the foamed backing layer.

A lower density of the foamed backing layer results in a lower material use and a lower weight, which is beneficial for transport and installation, yet also results in a lower bending stiffness, more desired acoustics, higher thermal insulating properties and a high residual indentation of the covering. Preferably, the residual indentation is lower than 0.35 mm, measured according to EN ISO 24343. More preferably, the residual indentation is lower than 0.2 mm, and even more preferably lower than 0.1 mm. This can be achieved by providing a sufficient high density of the foamed backing layer and a sufficient low content of plasticizers in the foamed backing layer. Such density can be achieved using foams of the closed cell type, contrary to the commonly used hard foams of the open cell type, such as, for example, polyester hard foams.

In a preferred embodiment of the covering, the backing layer has a basis weight of 100 gsm to 750 gsm. More preferably, the backing layer has a basis weight of 150 gsm to 500 gsm. Even more preferably, the backing layer has a basis weight of 200 gsm to 300 gsm.

1.4 Textile Layer

The covering comprises a textile layer on the bottom side of the backing layer. Suitable materials for the textile layer may be glass fibres, cellulose fibres, polyester fibres, polyamide fibres, yet preferably polyester fibres. The textile layer may be in the form of a woven or nonwoven layer. The textile layer may directly be attached to the backing layer by pressing the textile layer towards the backing layer just before the backing layer is being gelled by thermal treatment.

Optionally, the textile layer is attached to a gelled backing layer by a contact layer. The contact layer comprises a polymeric material. The contact layer may comprise an adhesive or a thermoplastic material. The contact layer is preferably a layer of thermoplastic material. Preferably, the contact layer comprises PVC. Various stabilizers as well as colorants may also be included in the composition of the contact layer. Besides, common additives may be included in the composition of the contact layer. Blowing agents may also be included. The contact layer may comprise a filler. Preferably, the filler is chalk. The chalk is preferably comprised of particles with at least 95% of the particles having a size of at most 150 µm, and more preferably of at most 100 µm, measured according to ISO 13317-3. In an embodiment of the present invention, fillers constitute at least 10 wt. %, preferably at least 20 wt. % and more preferably from 25 to 30 wt. % of the contact layer, calculated relatively to the total weight of the contact layer.

Gelling of the contact layer comprising thermoplastic material by thermal treatment is a possible means to attach the textile layer to the backing layer, provided that, as the result, the textile layer is at least partially impregnated by the contact layer. When attaching the backing layer to the textile layer through a contact layer comprising thermoplastic material, the selection of a nonwoven textile layer results in an improved bonding between the textile layer and the contact layer.

In a preferred embodiment, the textile layer is a nonwoven layer of textile. The textile layer may be calendered and/or thermobonded, and preferably possesses a thickness from 0.20 mm to 1.6 mm, more preferably from 0.35 mm to 1.0 mm, and even more preferably from 0.50 mm to 0.70 mm.

The application of the textile layer confers an increased extent of stiffness to the covering of the present invention. The textile layer preferably possesses an elongation capacity from 30 to 120%. In a more preferred embodiment, the textile layer is a nonwoven spun-bond material. A spun-bond nonwoven material is preferred above other nonwoven materials, such as, for example, needle-punched nonwoven material, since a spun-bond nonwoven material possesses high material strength and provides the covering with a high bending stiffness.

In a preferred embodiment of the covering, the textile layer is comprised of two synthetic materials, whereby the two synthetic materials have a different melting point. The textile layer is preferably a nonwoven textile layer made from different polymers that exist either in separate filaments or together in one filament. It would therefore be possible that the nonwoven textile layer comprises two filament types. The two filament types are predominantly made from different polymers with different melting points, so-called bifilament types. The term "predominantly" as used herein means at least 90%. It is preferred that the melting points of the two different polymers differ by at least 10° C. More preferably the melting points differ by at least 50° C. Such a product could also be thermally bonded by subjecting the nonwoven product to a temperature in the range of the melting point of the polymer with the lower melting point. However, this nonwoven product would not be bonded at each crossing point since fibres comprising the polymer with the higher melting point might cross each other. Only crossing points of fibres in a combination high and low melting point or low and low melting point would be bonded and not the crossing points of fibres with high melting point. A nonwoven carrier made from bicomponent filaments is therefore preferred. The bicomponent filaments of the nonwoven carrier are thermally bonded. Bicomponent filaments are filaments of two polymers of different chemical construction. A basic distinction is being drawn between three types: side by side types, sheath core types and matrix/fibril types.

In another preferred embodiment of the covering, the textile layer comprises a sheath-core type bicomponent nonwoven material. Preferably, the nonwoven textile layer comprises sheath core type bicomponent filaments. Such a sheath-core type bicomponent nonwoven material possesses a core which acts as a backbone with the sheath being the bonding medium of the backbone. The structure of such a product becomes very stable because the filaments are bonded at each crossing point of the filaments thus creating a nonwoven with the highest quantity of bonding points. The dimensional stability of the nonwoven carrier can be made regular over the length and width by optimising the filament distribution. This structure gives enough resistance to the high local impregnation pressure needed for obtaining a smooth impregnated surface over the full width. The great number of bonding points provides a stable nonwoven textile layer already at low area unit weights while leaving enough open space for penetration of the coating, and, when present, the contact layer, through the nonwoven textile layer which ensures good mechanical bonding. The sheath-core type bicomponent nonwoven material possesses a uniform stability. The properties of the described sheath-core type bicomponent nonwoven material make possible a stable processing at low weight and thickness.

In another preferred embodiment of the covering, the bicomponent nonwoven material of the textile layer comprises a core of polyester and a sheath of polyamide. Preferably, the sheath-core type bicomponent nonwoven material comprises a core consisting mainly of polyester and a sheath consisting mainly of polyamide. Alternatively, the sheath consists mainly of polyamide 6 and the core consists mainly of polyethylene terephthalate. Preferably the sheath/core ratio lies between 95/5 volume percent and 5/95 volume percent. More preferably the sheath/core ratio lies between 50/50 volume percent and 5/95 volume percent.

In another preferred embodiment of the covering, the textile layer has a basis weight of 50 gsm to 2500 gsm. More preferably, the textile layer has a basis weight of 75 gsm to 1000 gsm. Even more preferably, the textile layer has a basis weight of 100 gsm to 350 gsm. Most preferably, the textile layer has a basis weight of 150 to 280 gsm. A basis weight of the textile layer between these limits ensures that the textile layer is open enough for penetration of the coating and, if present, of the contact layer, ensuring good mechanical bonding. A higher basis weight can be selected for the textile layer when high rigidity is desired while a lower basis weight results in more flexible and more economical materials.

1.5 Coating

The covering according to the present invention comprises a coating applied to the bottom side of the textile layer, opposite to the backing layer. The application of the coating in the covering is intended to increase the rigidity, bending stiffness, resistance to indentation of the covering, and further prevents wrinkling of the textile layer, thereby increasing the similarity to surface coverings, for the covering of surfaces such as, for example, floors, walls and ceilings, which are made from a natural, non-synthetic material such as, for example, wood or stone. Furthermore, the addition of the coating results in a smoother reverse side of the covering. The reverse side of the covering is defined as the side which is intended to be in contact with a surface, such as, for example, a floor, wall or ceiling. According to the present invention, the reverse side of the covering corresponds to the bottom side of the coating. The increased smoothness of the reverse side of the covering results in a decreased specific surface area of the reverse side and thereby improves the gluing properties. The improved gluing properties facilitate the installation of the covering of the present invention as covering of a surface, such as, for example, a floor, wall or ceiling, and contribute to a better attachment of the covering to such surfaces. Furthermore, the smooth reverse side will require less adhesive to be attached to a surface than would be necessary for the textile layer to be attached to a same surface, thereby considerably reducing the adhesive cost.

The coating comprises a polymeric material. The coating preferably comprises a thermoplastic material. The coating preferably includes plasticizers and/or fillers. The top side of the coating is preferably attached to the bottom side of the textile layer by coating techniques, yet may also be attached by any other suitable technique, such as, for example, calendering, solvent welding, ultrasonic welding and adhesive assisted lamination.

In a preferred embodiment, the textile layer is at least partially impregnated by the coating, meaning that the coating penetrates at least a small proportion of the thickness of the textile layer. Penetration of the textile layer with the coating secures the material of the textile layer, resulting in a more stable, more rigid textile layer. The coating may penetrate from 0% to 100% of the thickness of the textile layer. In an embodiment of the present invention, the coating penetrates at least 50% of the thickness of the textile layer. In another embodiment of the present invention, the coating penetrates at least 90% of the thickness of the textile layer, resulting in a substantially impregnated textile layer.

In another aspect of the covering, the coating comprises PVC. The PVC preferably possesses a K value from 60 to 70 and more preferably a K value from 60 to 67.

In another aspect of the covering, the coating may be applied as a polymer dispersion and/or a polymer emulsion.

A polymer dispersion is a system in which polymers in the solid state are dispersed in a continuous phase of a different composition or state. A thermoplastic polymer is a polymer showing thermoplastic behaviour. A dispersion of thermoplastic polymers is generally prepared in aqueous or low boiling organic media as the continuous phase. Water is the preferred continuous phase for toxicological, safety, and environmental reasons. However, low boiling solvents such as acetone, methanol, ethanol, isopropanol, methylethylketone and similar solvents may be utilized, provided that the polymer does not dissolve in the solvent selected. Mixtures of solvents, particularly aqueous mixtures such as methanol/water are also useful. In particular, a dispersion of a thermoplastic polymer may be prepared, for example, by dissolving a suitable thermoplastic polymer into a solvent, adding the resulting solution to water and a surfactant with intensive mixing, preferably under conditions of high shear, to form an emulsion of the thermoplastic polymer/solvent in the aqueous continuous phase followed by removal of the solvent by distillation to form a dispersion of the thermoplastic polymer. In an embodiment of the present invention, a dispersion of PVC is used for the production of the coating of the present invention. More preferably, a dispersion of PVC is selected which has a relative viscosity from 1.56 to 2.52. Alternatively, dispersions of other thermoplastic materials, such as, for example, polyethylene, polyester and polyurethane, can be used for the production of the coating of the present invention. A polymer emulsion is a fluid system in which polymers in the liquid state are dispersed in a liquid continuous phase. In case of a thermoplastic polymer emulsion, the continuous phase is preferably water, but may also be other solvents which have high volatility. The dispersed phase of such emulsions contains the thermoplastic polymer in the form of a solution which includes a solvent or as a solution of the thermoplastic polymer in a heat-curable monomer which is liquid at room temperature and which also acts as a solvent for the thermoplastic polymer. In an embodiment of the present invention, an emulsion of PVC is used for the production of the coating of the present invention. More preferably, an emulsion of PVC is selected which has a relative viscosity from 2.05 to 3.40, preferably from 2.30 to 2.65. Alternatively, emulsions of other thermoplastic materials, such as, for example, polyethylene, polyester and polyurethane, can be used for the production of the coating of the present invention.

In another aspect of the covering, the coating further comprises additives selected from a group comprising plasticizers, stabilizers, fillers, colorants, biocides and combinations thereof.

Any plasticizer may be used, including any conventional plasticizer. Preferably, plasticizers constitute from 1 to 30 wt. %, and more preferably from 5 to 25 wt. % of the coating. Through the use of plasticizers, the fluidity or plasticity of the thermoplastic material of the coating can be improved, which is helpful in the impregnation of the textile layer by the coating. Stabilizers may be included in the composition of the coating to reduce the harmful effects of degradation due to heat and/or UV light. Various fillers may be used. Preferably, chalk and/or talc are used as a filler. The chalk is preferably comprised of particles with at least 95% of the particles having a size of at most 150 µm, and more preferably of at most 100 µm, measured according to ISO 13317-3. The talc is preferably comprised of particles with at least 95% of the particles having a size less than 25.0 µm, measured according to ISO 13317-3. Preferably, the filler constitutes at least 30 wt. %, preferably at least 40 wt. %, and more preferably from 45 to 60 wt. % of the coating. Colorants may be used in the formulation of the coating. Suitable colorants are pigments such as titanium dioxide and carbon black. Titanium dioxide and carbon black also function as infrared attenuating agents. In a preferred embodiment, from 0.5 wt. % to 2 wt. % of carbon black is added to the coating, resulting in a black-coloured coating. Alternatively, other pigments, dyes, inks and/or paints may be used as colorants in the formulation to provide the coating with a desired colour. Non-excluding examples of suitable biocides that can be used in the formulation of the coating include methyl bisthiocyanate, betabromo betanitrostyrene, tetrachloro isonaphalonitrile, 2-bromo-2-nitro-1,3-propanol, 5-chloro-4-isothiazolin-3-one, 2-methyl-4-isothiazolin-3-one, and/or 3,4-chlorophenyl-3,4 dichlorophenyl urea. If present in the coating, biocides are preferably included for an amount of 0.025 to 2 wt. % of the coating. The presence of biocides helps protect the coating, and consequently the covering, from bacterial and fungal microbes. Besides, other additives may be included in the composition of the coating, which include any one or combination of more than one of the following: flame retardants (for example, aluminium trihydroxide, brominated flame retardants such as brominated polymers, hexabromocyclododecane, phosphorous flame retardants such as triphenylphosphate, and flame retardant packages that may including synergists such as, for example, dicumyl and polycumyl); lubricants (for example, calcium stearate and barium stearate); and acid scavengers (for example, magnesium oxide and tetrasodium pyrophosphate). Blowing agents may also be included.

In another aspect of the covering, the coating has a basis weight of 100 gsm to 1000 gsm.

Preferably, the coating of the covering of the present invention has a basis weight of 100 gsm to 1000 gsm. More preferably, the coating has a basis weight of 250 to 500 gsm. Even more preferably, the coating has a basis weight of 300 to 450 gsm.

2. Method for Producing a Covering

In a second aspect, the invention provides a method for producing a covering, such as a floor covering, wall covering or ceiling covering, the method comprising the steps of:
producing a substrate layer (2) comprising one or more thermoplastic layers, and optionally, one or more reinforced thermoplastic layers;
attaching a surface layer (1) to the top side (2a) of the substrate layer (2);
attaching the top side (3a) of a backing layer (3) to the bottom side (2b) of the substrate layer (2);
attaching the top side (4a) of a textile layer (4) to the bottom side (3b) of the backing layer (3), optionally through a contact layer,
whereby a coating (5) is applied to the bottom side (4b) of said textile layer (4); thereby obtaining a covering.

In a first, preferred non-limiting embodiment, the method according to the second aspect of the invention comprises, sequentially, the steps of:
producing a substrate layer (2) comprising one or more thermoplastic layers and optionally, one or more reinforced thermoplastic layers;
attaching a surface layer (1) to the top side (2a) of the substrate layer (2),
attaching the top side (3a) of a backing layer (3) to the bottom side (2b) of the substrate layer (2);
attaching the top side (4a) of a textile layer (4) to the bottom side (3b) of the backing layer (3), optionally through a contact layer;
curing the entirety of said surface layer (1), said substrate layer (2), said backing layer (3) and said textile layer (4);
applying a coating (5) to the bottom side (4b) of said textile layer (4)
solidifying said coating (5) by a heat treatment.

In a first step of the production of a covering of the present invention, a substrate layer is produced comprising one or more thermoplastic layers, the substrate layer optionally comprising one or more reinforced thermoplastic layers. A thermoplastic layer can be produced by extruding or coating a thermoplastic material on a reinforcement material followed by solidifying the thermoplastic material. If the substrate layer comprises multiple thermoplastic layers, the independent thermoplastic layers may be produced in continuous operation and subsequently attached to each other by techniques such as, for example, coating, calendering or pressing. Preferably, the independent thermoplastic layers are attached by coating. The heating of the thermoplastic material is preferably achieved by passing the thermoplastic material over a heated drum. Preferably, the heating relates to heating from a temperature of less than 100° C. to a temperature of more than 100° C. Preferably, a temperature of minimum 120° C. and still better minimum 130° C. is obtained. Preferably, the temperature does not rise above 175° C. More preferably, a temperature of 140° C. to 170° C. is obtained. Preferably, the thermoplastic material, before being heated, has a temperature of less than 60° C. and still better of less than 40° C.

In a second step of the production of a covering of the present invention, a decorative layer is attached on the top side of the substrate layer. Preferably, the decorative layer is provided in continuous operation, following the production of the substrate layer. The decorative layer is a component of a surface layer. A thermoplastic material composition for the decorative layer is attached to the top side of the substrate layer by techniques such as, for example, coating, calendering or pressing. Preferably, the thermoplastic material composition is attached by coating. For the production of a chemically embossed decorative layer, at least one blowing agent is included in the thermoplastic material composition. Subsequently, the obtained structure is gelled at a temperature from 120° C. to 160° C., preferably at a temperature from 130° C. to 150° C.

In a third step, the decorative layer is printed. For the production of a chemically embossed decorative layer, at least one of the used inks contains an expansion inhibitor.

After the printing and eventual drying of the decorative layer, the wear layer is provided in a fourth step. The wear layer is a component of the surface layer. A thermoplastic material composition for the wear layer is attached to the decorative layer by techniques such as, for example, coating, calendering or pressing. Preferably, the thermoplastic material composition is attached by coating. Subsequently, the obtained structure is gelled at a temperature from 120° C. to 160° C., preferably at a temperature from 130° C. to 150° C.

In a fifth step of the production of a covering of the present invention, a backing layer is provided on the bottom side of the substrate layer. The backing layer is preferably provided in continuous operation, following the attachment of the surface layer to the substrate layer. A thermoplastic material composition for the backing layer is attached to the bottom side of the substrate layer by techniques such as, for example, coating, calendering or pressing. Preferably, the thermoplastic material composition is attached by coating.

In a sixth step of the production of a covering of the present invention, a textile layer is attached to the backing layer, thereby providing a sheet, defined as the entirety of said surface layer (1), said substrate layer (2), said backing layer (3) and said textile layer (4). The textile layer is attached to the bottom side of the backing layer, opposite to the substrate layer. The textile layer is pressed against the thermoplastic material, while the thermoplastic material is still not gelled. The pressure level applied to press the textile layer against the thermoplastic material is minimum 0.01 MPa and maximum 0.4 MPa, and is preferably a pressure level from 0.2 to 0.3 MPa. Alternatively, a textile layer can be attached to the backing layer through a contact layer. When a thermoplastic material is used as a contact layer, the thermoplastic material is applied to a bottom side of the backing layer, preferably by coating, and the textile layer is pressed against the thermoplastic material, for which the abovementioned pressure levels may be used.

In a seventh step, the sheet is cured for a period of between 15 seconds and 30 minutes at a temperature of between 120° C. and 240° C., before the coating is applied to the textile layer of the sheet. Preferably, the sheet is cured for a period between 30 seconds and 10 minutes at a temperature of between 140° C. and 220° C., and even more preferably for a period between 1 minute and 3 minutes at a temperature of between 160° C. and 200° C.

When the abovementioned provisions are taken for the production of a chemically embossed decorative layer, the heat also causes the decorative layer to expand, thus creating the chemically embossed effect.

Besides, after the curing of the sheet, in an eighth step, the surface layer may be mechanically embossed. The mechanical embossing can, for example, be performed by heating the top layer with an IR heater and subsequent treatment of the plastic top layer with a mechanical embossing roll. If a surface coating is provided on top of the wear layer, the mechanical embossing may be performed before or after that the surface coating is provided.

After the curing of the sheet, in a ninth step, a surface coating may be provided on top of the wear layer as an additional component of the surface layer. Preferably, the surface coating is produced in continuous operation, following the curing of the sheet. The surface coating is preferably produced from a UV lacquer. The UV lacquer is applied to the wear layer and subsequently cured by preferably using a UV wavelength of about 200 nm to about 380 nm and a curing temperature below 50° C.

In a tenth step of the production of a covering of the present invention, a coating is further applied to the textile layer of the sheet, thereby providing a covering. Preferably, the coating is provided in continuous operation.

The step of providing the coating to the textile layer of the sheet and gelling it, provides a covering with an increased rigidity and an increased resistance to indentation as compared to the sheet.

Preferably, the coating, comprising a thermoplastic material, is applied to the textile layer of the sheet, followed by solidifying the coating to the sheet by a heat treatment, by passing the combination of coating and sheet over a heated drum. Preferably, the heating to solidify the coating to the sheet relates to heating from a temperature of less than 100° C. to a temperature of more than 100° C. Preferably, a temperature of minimum 120° C. and still better minimum 130° C. is obtained. Preferably, the temperature does not rise above 175° C. More preferably, a temperature of 140° C. to 170° C. is obtained. Preferably, the coating, before being heated, has a temperature of less than 60° C. and still better of less than 40° C.

In a preferred embodiment, the invention provides a method for producing a covering according to the second aspect of the invention, whereby said coating (5) is applied to the bottom side (4b) of said textile layer (4) prior to attaching the top side (4a) of said textile layer (4) to the bottom side (3b) of said backing layer (3).

A second, preferred non-limiting embodiment of the method according to the second aspect of the invention comprises, sequentially, the steps of:
  (i) producing a substrate layer (2) comprising one or more thermoplastic layers and optionally, one or more reinforced thermoplastic layers;
  (ii) attaching a surface layer (1) to the top side (2a) of the substrate layer (2), and attaching a backing layer (3) to the bottom side (2b) of said substrate layer (2);
  (iii) applying a coating (5) on the bottom side (4b) of a textile layer (4) and optionally, curing the entirety of said textile layer (4) and coating (5);
  (iv) attaching the top side (4a) of said textile layer (4) to the bottom side (3b) of said backing layer (3), optionally, through a contact layer; and (v) curing the entirety of said surface layer (1), said substrate layer (2), said backing layer (3), said textile layer (4) and said coating (5).

A substrate layer (2) can be obtained analogous to method steps described above. A surface layer (1) can be obtained analogous to method steps described above. A backing layer (3) can be obtained analogous to method steps described above.

The surface layer (1) can be attached to the top side (2a) of the substrate layer (2) in an analogous way as described in method steps above. The backing layer (3) can be attached to the bottom side (2b) of the substrate layer (2) in an analogous way as described in the method steps above.

A coating (5) can be applied to the bottom side (4b) of a textile layer (4) in an analogous way as described in method steps above.

Curing the entirety of said textile layer (4) and coating (5) is preferably performed by passing the combination of textile layer (4) and coating (5) over a heated drum. Preferably, the heating to cure the coating to the textile layer relates to heating from a temperature of less than 100° C. to a temperature of more than 100° C. Preferably, a temperature of minimum 120° C. and still better minimum 130° C. is obtained. Preferably, the temperature does not rise above 175° C. More preferably, a temperature of 140° C. to 170° C. is obtained. Preferably, the coating, before being heated, has a temperature of less than 60° C. and still better of less than 40° C.

Attaching the top side (4a) of said textile layer (4) to the bottom side (3b) of said backing layer (3) can be performed by pressing said textile layer (4) against the bottom side (3b) of said backing layer (3), while said backing layer (3) is still not gelled. The pressure level applied to press the textile layer against the backing layer is minimum 0.01 MPa and maximum 0.4 MPa, and is preferably a pressure level from 0.2 to 0.3 MPa. Alternatively, the textile layer (4) can be attached to the backing layer (3) through a contact layer. When a thermoplastic material is used as a contact layer, the thermoplastic material is applied to the bottom side (3b) of the backing layer (3), preferably by coating, and the textile layer (4) is pressed against the thermoplastic material, for which the abovementioned pressure levels may be used.

Curing of the entirety of said surface layer (1), said substrate layer (2), said backing layer (3), said textile layer (4) and said coating (5) is preferably performed by heating the entirety at a temperature of between 120° C. and 240° C. for a period of between 15 seconds and 30 minutes ° C. More preferably, the entirety of said surface layer (1), said substrate layer (2), said backing layer (3), said textile layer (4) and said coating (5) is cured for a period between 30 seconds and 10 minutes at a temperature of between 140° C. and 220° C., and even more preferably for a period between 1 minute and 3 minutes at a temperature of between 160° C. and 200° C.

The second, alternative embodiment of the method according to the second aspect of the invention, may further comprise the steps of a) mechanical embossing of the surface layer and b) the application of a surface coating as an additional component of the surface layer, which steps can be performed analogously to method steps described above.

In a preferred embodiment, the invention provides a method according to the second aspect of the invention for producing a covering, whereby in a final step, the covering is cut into panels, more preferably whereby (i) the cutting of said covering and (ii) the creation of a bevel along the formed edge(s) is realized simultaneously, i.e. in one processing step. This is advantageous because accordingly the shaping and dimensioning of the final covering panel can be performed during one processing act, whereas prior art technologies require at least two separate acts to be performed consecutively.

In a preferred embodiment, the realisation of the simultaneous cutting and creation of a bevel is provided by pushing a cutting blade and one or two side blades vertically into a covering, thereby at least partially protruding the surface layer, and sliding said cutting blade to shape the covering panel. Said side blades are provided in relation to said cutting blade to form the predetermined geometry of the bevel. This means that the angle between said cutting blade and said side blade(s) as well as the geometry of said side blade(s) are provided to be complementary to the geometry of the bevel. Said cutting blade can be provided with a nozzle to provide the cutting zone with pressurized air to remove particles from the cutting surface, which particles may be resulting from a processing act and which when pressed between said side blade(s) and the cutting surface would yield involuntary indentations. Furthermore, said side blades can be provided as slide-on side blades or as roll-over side blades. Slide-on side blades are preferred for their process stability, whereas roll-over side blades are preferred for providing a bevel without friction between side blade and surface of the covering.

In another embodiment, the realisation of the simultaneous cutting and creation of a bevel is achieved by the use of a plotter with an automated cutting head, whereby all needed knifes to cut through the material and those needed to provide a beveled edge are mounted on the same head. This is a low-cost and flexible way to achieve the simultaneous cutting and beveling. All possible panel sizes can be defined by software.

In one embodiment, the height of the side blades or bevel cutting knifes and the height of the through-cut knife or cutting blade can be separately and automatically adjusted, e.g. in function of the thickness of the covering.

The invention is further described by the following non-limiting example which further illustrates the invention, and is not intended to, nor should it be interpreted to, limit the scope of the invention.

EXAMPLES

This example describes the production and properties of a possible covering according to the present invention. The formulations for the production of various layers, which are expressed in wt. %, included to produce the possible covering of this example, are grouped in the table below.

|  | WL[a] | DL[b] | SU[c] | FBL[d] | CO[e] |
|---|---|---|---|---|---|
| PVC powder K[f] 60-70 | 0 | +/−40 | +/−30 | +/−30 to 45 | 0 |
| PVC powder K[f] 70-90 | +/−70 | 0 | 0 | 0 | +/−69 |
| Diisononyl phthalate (DINP) | +/−10 | +/−10 | +/−10 | +/−10 | +/−10 |
| Fast fusing plasticizer[g] | +/−10 | +/−5 | +/−5 | +/−5 to 10 | +/−10 |
| Diisooctyl terephthalate (DOTP) | +/−5 | +/−10 | +/−5 | +/−5 | +/−5 |
| Limestone filler | 0 | +/−30 | +/−50 | +/−30 to 45 | 0 |
| Disperging agent | 0 | +/−0.5 | +/−0.5 | +/−1 | 0 |
| Viscosity decreasant | +/−1.5 | +/−1 | +/−1 | +/−0.5 to 1.5 | +/−1.5 |
| Azodicarbonannide | 0 | +/−1 | 0 | +/−0.5 to 1.5 | 0 |

|  | WL[a] | DL[b] | SU[c] | FBL[d] | CO[e] |
|---|---|---|---|---|---|
| Deaeration agent | +/−1 | +/−0.5 | 0 | 0 | +/−1 |
| TiO$_2$ | 0 | +/−2 | 0 | 0 | 0 |
| Ca/Zn stabilizer | +/−2.5 | 0 | 0 | 0 | +/−2.5 |
| Carbon black | 0 | 0 | 0 | 0 | +/−1 |

[a]wear layer;
[b]decorative layer;
[c]substrate layer;
[d]foamed backing layer;
[e]coating;
[f]K value;
[g]fast fusing plasticizer, known to a man skilled in the art.

A nonwoven glass fibre film, which is 0.3 mm thick and which weighs 35 gsm, is coated with 425 gsm of a filled PVC emulsion corresponding to formulation "SU" in the table. The thus impregnated glass fibre film is then positioned on a drum heated to 155° C., resulting in a substrate layer with a thickness of 0.35 mm.

Subsequently, the top side of the substrate layer is coated with 250 gsm of a PVC plastisol corresponding to formulation "DL" in the table. The coated structure is then heated at 155° C. over a gelling drum. The decorative layer thereby provided on top of the substrate layer is printed with inks, in order to provide a printed decorative layer which is decorated with a pattern.

In a next step, the printed decorative layer is coated with 610 gsm of a PVC composition corresponding to formulation "WL" in the table. The coated structure is then heated at 155° C. over a gelling drum. The wear layer thereby formed on top of the printed decorative layer has a thickness of 0.55 mm.

Subsequently, the bottom side of the substrate layer, opposite to the decorative layer, is coated with 625 gsm of a PVC plastisol corresponding to formulation "FBL" in the table.

A textile layer comprising a sheath-core type bicomponent nonwoven material, comprising a core of polyester and a sheath of polyamide, of which the sheath/core ratio is 30/70, with a thickness of 0.67 mm and a basis weight of 250 gsm, is pressed to the PVC plastisol by applying a pressure level of 0.25 MPa. The obtained structure is then heated in an oven at 195.5° C. during 2 minutes, thereby forming a sheet. The foamed backing layer thereby formed beneath the substrate layer has a thickness of 0.65 mm. The foamed decorative layer thereby provided has a thickness of 0.20 mm.

After cooling, the top layer is reheated using IR lamps to a surface temperature of 150-160° C., directly after which the sheet is provided with a mechanical emboss. The emboss is 'frozen' by fierce cooling.

Subsequently, a UV lacquer, containing 20 to 30 wt. % oxybis(methyl-2,1-ethanediyl) diacrylate, 10 to <20 wt. % 2-ethylhexylacrylaat, 10 to <20 wt. % of a polymer based on polyether polyol, epoxy resin and acrylic acid ester, which is modified, 5 to 10 wt. % 4,4'-(1-methylethylidene)bis-phenol and a polymer with (chlormethyl)oxirane, 1 to 5 wt. % benzophenone, 1 to 5 wt. % 1,6-hexanediol diacrylate, 1 to 5 wt. % 2-hydroxy-2-methylpropiophenone, <1 wt. % 2-(2-ethoxyethoxy)ethyl acrylate, <1 wt. % epoxyacrylate oligomer, <1 wt. % acrylic resin, <1 wt. % trimethylolpropanetriacrylate, <1 wt. % 2-phenoxyethyl acrylate, <1 wt. % acrylic modified poly siloxanes, and <1 wt. % pentaerythritol-tetraacrylate, is applied to the wear layer and subsequently cured by using a UV wavelength of 260 nm and a curing temperature of 45° C. The surface coating thereby formed has a thickness of 0.02 mm.

Subsequently, the bottom side of the textile layer of the sheet is coated with 375 gsm of a PVC emulsion corresponding to the formulation "CO" in the table. The coated sheet is then positioned on a drum heated to 192° C., resulting in a covering with a thickness of about 2.5 mm and a basis weight of about 2570 gsm. The coating formed at the bottom side of the textile layer has a thickness of 0.4 mm and penetrates about 85% of the thickness of the textile layer.

A surface of the coating which is not in contact with the textile layer, equal to the surface of the coating which is faced to the environment, is substantially levelled, corresponding to a low specific surface area. This levelled surface of the coating enables an efficient and economical application of adhesive to the covering, as well as a durable bond between the covering and a surface to which it is intended to be applied, such as, for example, a floor, wall or ceiling. This covering has a gloss level, as measured at an angle of 60°, of 3.5.

Besides, this covering has a tear resistance of 150 N, as measured according to EN 432, and a residual indentation of 0.10 mm, as measured according to EN 433. This covering only shows a curling of 4 mm, as measured according to EN 434. The flexural properties of this covering were measured according to ISO 178. For a section of the covering with a width of 1 cm, the following flexural properties were observed: a modulus of 2190 MPa, an ultimate force of 4.27 N and an ultimate stress of 13.71 MPa. The tensile properties of a section of the covering with a width of 1 cm were measured according to ISO 527-3. The following tensile properties were observed: an ultimate force of 217 N, an ultimate stress of 9.81 MPa, an ultimate strain of 36.5%, a modulus of 194 MPa and a break strain of 38.5%. These flexural and tensile properties point at a covering with sufficient stiffness and rigidity while maintaining sufficient flexibility, the latter enabling the covering to be provided easily on a surface, such as, for example, a floor, wall or ceiling.

The invention claimed is:

1. Covering including a floor covering, wall covering or ceiling covering, said covering comprising:
    a surface layer (1)), said surface layer (1) further comprising a decorative layer having a decorative pattern and a wear layer on top of the decorative layer;
    a substrate layer (2) attached to said surface layer (1), said substrate layer (2) optionally comprising one or more reinforced thermoplastic layers;
    a backing layer (3) on a bottom side (2*b*) of said substrate layer (2), opposite to said surface layer (1);
    a textile layer (4) attached to a bottom side (3*b*) of said backing layer (3), optionally through a contact layer;
    wherein said covering further comprises a PVC coating (5) applied to a bottom side (4*b*) of said textile layer (4), and
    wherein the coating (5) penetrates at least 50% of a thickness of the textile layer (4).

2. Covering according to claim 1, whereby said coating (5) comprises a thermoplastic material.

3. Covering according to claim 2, whereby said coating (5) further comprises additives selected from a group comprising plasticizers, stabilizers, fillers, colorants, biocides and combinations thereof.

4. Covering according to claim 1, whereby said textile layer (4) is comprised of two synthetic materials, whereby said two synthetic materials have a different melting point.

5. Covering according to claim 4, whereby said textile layer (4) comprises a sheath-core type bicomponent nonwoven material.

6. Covering according to claim 5, whereby said bicomponent nonwoven material comprises a core of polyester and a sheath of polyamide.

7. Covering according to claim 1, whereby said backing layer (3) has a basis weight of 100 gsm to 750 gsm.

8. Covering according to claim 1, whereby said coating (5) has a basis weight of 100 gsm to 1000 gsm.

9. Covering according to claim 1, whereby said textile layer (4) has a basis weight of 50 gsm to 2500 gsm.

10. Method for producing a covering including a floor covering, wall covering or ceiling covering, the method comprising the steps of:
- producing a substrate layer (2) comprising one or more thermoplastic layers, and optionally, one or more reinforced thermoplastic layers;
- attaching a surface layer (1) to a top side (2a) of said substrate layer (2), whereby the surface layer (1) comprises a decorative layer having a decorative pattern and a wear layer on top of the decorative layer;
- attaching a top side (3a) of a backing layer (3) to a bottom side (2b) of said substrate layer (2);
- attaching a top side (4a) of a textile layer (4) to a bottom side (3b) of said backing layer (3), optionally, through a contact layer,
- wherein a PVC coating (5) is applied to a bottom side (4b) of said textile layer (4); and
- wherein the coating (5) penetrates at least 50% of a thickness of the textile layer (4); thereby obtaining a covering.

11. The method according to claim 10, whereby the entirety of surface layer (1), substrate layer (2), backing layer (3) and textile layer (4) is cured for a period of between 15 seconds and 30 minutes at a temperature of between 120° C. and 240° C., before applying said coating (5) to the bottom side (4b) of said textile layer (4).

12. The method according to claim 10, whereby said coating (5) is solidified to said entirety of surface layer (1), substrate layer (2), backing layer (3) and textile layer (4) by a heat treatment.

13. The method according to claim 10, whereby said coating (5) is applied to the bottom side (4b) of said textile layer (4) prior to attaching the top side (4a) of said textile layer (4) to the bottom side (3b) of said backing layer (3).

14. The method according to claim 10, whereby said covering is cut into panels and whereby a bevel is created simultaneously on the panels on both sides of the cut.

* * * * *